Patented Sept. 15, 1953

2,652,380

UNITED STATES PATENT OFFICE 2,652,380

SOLUBLE CALCIUM SALT OF A COPOLYMER OF VINYL ACETATE AND A MONO-ESTER OF MALEIC ACID

Ross M. Hedrick and David T. Mowry, Dayton, Ohio, assignors to Monsanto Chemical Company, St. Louis, Mo., a corporation of Delaware No Drawing. Application January 2, 1952, Serial No. 264,637

6 Claims. (Cl. 260—41)

This invention relates to the improvement of agricultural soils through the development of optimum physical structure. More specifically, the invention relates to new compositions of matter which have unusual effects on the fertility of the soil, in improving the rate of plant growth, the efficiency of nutrient utilization and the ease of cultivation of the soil.

In copending application, Serial No. 148,522, of which the present application is a continuation-in-part, there are described and claimed methods of using various water-soluble polymers in improving the physical structure of agricultural soils, and fertilizer compositions containing in combination both the water-soluble polymers and mineral plant nutrients. Although all of the compounds described in this application are effective as soil structure improvers, they are not all useful in the same manner or in degree of result. Many of them are formed as aqueous solutions or as soft, gummy solids, which cannot be dried effectively or otherwise converted into a solid form which can be readily ground to a finely divided state. Other polymeric substances are hygroscopic and take up water from the atmosphere upon storage and thereby become unsuitable for application to the surface of soils by means of conventional spreading equipment. Still other materials are difficult to polymerize to a sufficient extent so as to provide a substantially large number of reactive ionic nuclei on the polymer chain.

The primary purpose of this invention is to provide a composition which is an efficient and effective soil aggregating substance. A further purpose of this invention is to provide a novel composition which is readily and inexpensively produced in a finely divided stable solid form. A still further purpose of this invention is to provide a convenient and readily operative method for producing the soil structure improving agents.

It has now been found that the partial calcium salt of a copolymer of vinyl acetate and a maleic acid partial ester is unusually effective and useful in improving soil structure. A necessary property of all of the effective soil structure-improving agents is the water-solubility. This property is essential because the activity of the agent requires its dissolution in soil water and the transfer therefrom to soil increments where they are are chemically or physically adsorbed. It is well-known to prior investigators that the calcium salts of maleic acid copolymers are insoluble, and that the conversion to calcium salts of the soluble sodium salts has been a means of rendering compositions water-insoluble. Contrary to the teachings of the prior art the new partial calcium salts as defined hereinafter are readily water-soluble and are also useful soil-benefiting agents.

The partial calcium salts as defined hereinafter have other beneficial properties which are not possessed by the sodium, potassium and ammonium salts. The presence of sodium salts in agricultural soils is known to have deleterious effects on plant growth. The use of the sodium analogue of the new compounds to improve soil structure by addition of the defined quantity would reduce the total productivity of the soil. Although potassium and ammonium ions have beneficial nutrient values, they are usually not sufficient to offset the undesirable alkalinity, especially when used in concentrations required to develop optimum structure in soil of average normal structure. The calcium salt is furthermore desirable than the unneutralized acid in average fertile soils which tend to be acidic, however, the latter compounds may be very useful in normally alkaline soils which contain sufficient alkali to form salts in situ.

Since the most useful field application of the polymeric substances involves use in the form of finely divided solids, the new polymeric compositions are especially adaptable because they can be readily ground to any desired extent and spread uniformly over the surfaces by conventional means, and dispersed in the soil by rototilling, disking, raking, harrowing or by the action of other tilling apparatus. The finely divided polymers should have at least half of the particles small enough to pass a 80 mesh screen, and preferably should have substantially all of the particles smaller than 40 mesh. The size is not critical, except where optimum effect is required in a short period of time.

The partial calcium salts of the copolymers of vinyl acetate and the partial esters of maleic acid are difficult to describe by conventional chemical nomenclature. The following structural formula has been proposed, but it has not been identified as the true structure especially with respect to the position of the calcium ions which may be associated at random with any of the free carboxylic acid groups.

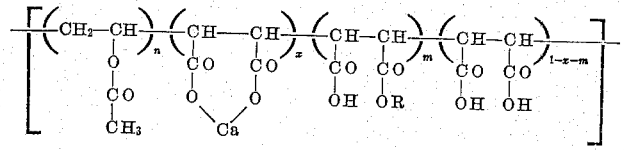

wherein $n$ equals one to two, wherein $x$ equals 0.1 to 0.5, wherein $m$ equals 0.2 to 0.6, and wherein $x+m$ is not greater than one (1) the various radicals being positioned at random in the linear polymer chain.

The new calcium salts are more definitely designated as the partial salts prepared by the reaction of (A) the copolymer of from one to two moles of vinyl acetate with one mole of maleic acid which has been previously esterified with from 0.2 to 0.6 mole of aliphatic alcohol having up to three carbon atoms and (B) from 0.1 to 0.5 mole of a calcium compound of the group consisting of calcium carbonate, calcium oxide and calcium hydroxide.

The polymerization of the maleic anhydride or the maleic anhydride partial ester and the vinyl acetate is preferably a mass reaction. The reactants are mixed and a small quantity, from 0.1 to 1.0 per cent, of a peroxy compound soluble in the reaction mixture is added. Benzoyl peroxide, esters of peroxy acids, including perboxic, percarbonic, persulfuric as well as various organic peroxy acids, organic hydroperoxides, and any other stable peroxy compound soluble in the reaction mixture may be used. The first stages of the reaction may be conducted in a closed reactor, preferably glass-lined, provided with an agitator, reflux condenser, and jacket for controlled heating and removal of the heat of polymerization. As the reaction proceeds, the reaction mass becomes increasingly viscous and the temperature is more difficult to control. While the mass is still fluid it is poured into molds of relatively thin cross section which are provided with means for heating the walls. When the reaction is completed, the solid resin formed is recovered by dismantling and removing the mold walls. The first stage of polymerization is conducted at a temperature of 40° C. to 75° C. for from ten to 30 hours and during the final solidification stage the temperature is gradually increased to a maximum of 80° C. or 90° C. to complete the polymerization. The temperatures and reaction periods are variable depending upon catalyst concentration and other variable conditions of operation.

The new copolymer of maleic acid ester and vinyl acetate may also be prepared by other methods, for example those described in U. S. Patent No. 2,562,852 to Baer.

In the practice of this invention the polymeric partial calcium salts may be prepared from simple readily available raw materials for example, maleic anhydride, vinyl acetate, methanol, and calcium hydroxide. The partial esters are first prepared by heating maleic anhydride with the desired proportion of monohydric alcohol. When this reaction is complete, the partial ester is then polymerized with from one to two molecular equivalents of vinyl acetate, by heating in an inert atmosphere, in the presence of a soluble peroxy catalyst, such as benzoyl peroxide. The resulting copolymer of vinyl acetate and maleic ester, which contains some residual anhydride groupings, is then converted to the carboxylic acid form in the presence of water. The resulting polymer may then react with calcium hydroxide, or other calcium compound, to form the partial calcium salt. The resulting salt may be then ground to the desired state of subdivision, but the grinding may effectively be performed at an intermediate stage, for example before the reaction of the calcium salt. If desired, the acidic copolymers and the previously ground calcium compound may be reacted in solid state by tumbling or ball-milling the finely divided powders.

For the purpose of this invention it is not necessary for the calcium salt to be entirely chemically reacted with the copolymer of vinyl acetate and the partial esters of maleic acid. If the calcium compound and the polymer are in a sufficiently subdivided dry state, they may be merely blended physically and applied to the soils in that form. In this case the solid reactants will dissolve in the soil water and the chemical reaction to form the calcium salt will take place in situ. In the practice of this modification of the invention, it is not necessary to hydrolyze the anhydride groups to carboxylic acid groups as a separate step. It will be apparent that the latter modification of the invention is most economical and is therefore the preferred method of practicing this invention. In the improvement of soil structure through the use of the new chemical compound, it is desirable for the compound to be dispersed in the soil more or less uniformly to the extent of from 0.001 to two per cent by weight of the top soil to the depth of cultivation. Optimum results are usually obtained through the use of from 0.01 to 0.2 per cent.

Since the partial calcium salt of the copolymer of vinyl acetate and the maleic acid partial esters may be formed in the soil mass, it will be readily apparent that the calcium compound and the maleic acid copolymer need not be mixed prior to the application to the soil. Thus, the calcium compound may be added to the soil and/or mixed into the soil either before or after the addition of the water-soluble polymer. The same effect may be achieved by adding the copolymer of vinyl acetate and the maleic acid partial ester to a soil already containing a substantial portion of the calcium compounds in reactive form. In general, agriculture limestone is not sufficiently subdivided to produce the necessary reaction in the soil body at the time of application. Thus, calcium compounds naturally occurring in the soil are not usually present in quantity and/or in sufficiently subdivided state to permit the optimum formation of the water-soluble calcium salts.

For optimum beneficial effect the molecular weight of the polymer is of some importance. It appears that molecular weights in excess of 10,000, are desirable and the preferred practice involves the use of polymers with molecular weights above 15,000. With most polymers the effect reaches a maximum at 30,000, to 100,000, and further increases in molecular weights do not usually improve the polymer, although no serious reduction in activity is experienced.

The polymers may be added directly to the soils if desired, but it is often more feasible to add the polymers with a diluent or extender, which may be a solvent, for example water, or a solid carrier, such as peat moss, limestone, gypsum, sand, clay, mineral fertilizer, silage, or other fertilizing or soil-improving substances. When added with a plant nutrient cooperative beneficial effects are noted in the rate of growth of crops on the treated soil. Soils improved by the fertilizer containing the polymers enable more rapid and abundant crop growth than can be obtained by the use of fertilizer alone. The utilization by the plants of any of the known fertilizer materials containing basic nutrients, such as nitrogen, phosphorus and potassium as well as trace elements, such as boron, manganese, magnesium, molybdenum, cobalt, and iron, may be improved by the addition of the structure-improving polymers described above.

The invention is further illustrated by the following specific example.

Example

The effect of various polymeric substances on the aggregate stability of soils was graphically demonstrated by the following procedure. Various 100-gram samples of Miami Silt Loam were intimately mixed with 0.1 per cent and 0.01 per cent of a polymer. Separate experiments were conducted on each of Carbowax 6000 (polyethylene oxide), polyvinylmethyl ether, Ureaform, Methocel 50 (methylcellulose) Methocel 1500 (methylcellulose), sodium alginate, and the partial (30 mole per cent) calcium salt of the copolymer of vinyl acetate and partial (45 mole per cent) methyl ester of maleic acid. The soil was pulverized to pass through a 0.25 mm. sieve, and was then mixed with 30 ml. of distilled water containing the appropriate amount of the polymer. The soil was well-mixed and pressed through a four mm. sieve to form soil crumbs. After drying for two days in a warm dry room, samples were blown with air at 50° C. for ten minutes to complete the drying. Forty-gram samples of the crumbs were placed on the top sieve of a set of three sieves, 0.84 mm., 0.42 mm., and 0.25 mm. respectively, arranged vertically in order of decreasing size. The screen assembly was raised and lowered in a water bath through a distance of 1.5 inches at the rate of thirty cycles per minute for thirty minutes. At the end of that time the sieves were raised, allowed to drain, and the soil aggregates on all screens were combined and weighed after drying at 80° C. The following table shows the observed aggregate residues as percentages of the total soil retained on the screens. This percentage is a measure of the aggregate stability of the soil and the resistance of the soil crumbs to physical breakdown in the presence of water.

| Polymer | Percent polymer on soil | Percent aggregates >0.25 mm. |
|---|---|---|
| Calcium salt | 0.1 | 92.5 |
| Do | .01 | 33.5 |
| Carbowax 6000 | .1 | .3 |
| Do | .01 | .3 |
| Polyvinyl methyl ether | .1 | .3 |
| Do | .01 | .3 |
| Ureaform | .1 | .4 |
| Do | .01 | .3 |
| Methocel 50 | .1 | 15.5 |
| Do | .01 | .5 |
| Methocel 1500 | .1 | 13.3 |
| Do | .01 | .5 |
| Sodium alginate | .1 | 41.3 |
| Do | .01 | .3 |

The invention is defined by the following claims.

What we claim is:

1. A composition of matter which comprises a calcium salt of a copolymer of one to two moles of vinyl acetate and one mole of a maleic anhydride which has been esterified with 0.2 to 0.6 moles of an alcohol of the group consisting of ethanol, methanol n-propanol and isopropanol.

2. A composition of matter capable of forming polymeric calcium salts by contact with water, which comprises a mixture of a finely divided copolymer of one to two moles vinyl acetate and one mole of maleic anhydride which has been esterified with 0.2 to 0.6 moles of an alcohol of the group consisting of ethanol, methanol, n-propanol and isopropanol, and a finely divided calcium compound of the group consisting of calcium carbonate, calcium oxide and calcium hydroxide.

3. A composition of matter which comprises a calcium salt made by reaction of 0.1 to 0.5 mole of calcium hydroxide and one mole of a copolymer of (A) an ester of maleic acid and from 0.2 to 0.6 mole of an alkyl alcohol having up to three carbon atoms and (B) from one to two moles of vinyl acetate.

4. A composition of matter capable of forming polymeric calcium salts by contact with water, comprising a mixture of (A) finely divided copolymer of one mole of an ester of maleic acid and 0.2 to 0.6 mole of an alkyl alcohol having up to three carbon atoms and one to two moles of vinyl acetate and (B) from 0.1 to 0.5 mole of a finely divided calcium hydroxide.

5. The method of preparing a water-soluble polymeric calcium salt which comprises esterifying one mole of maleic anhydride with from 0.2 to 0.6 mole of an alkyl alcohol having up to three carbon atoms, polymerizing the resulting partial ester with from one two mole equivalents of vinyl acetate, and contacting the copolymer in finely divided form with a compound of the class consisting of calcium oxide, calcium hydroxide and calcium carbonate in the presene of water.

6. The method of preparing a water-soluble polymeric calcium containing composition which comprises esterifying one mole of maleic anhydride with from 0.2 to 0.6 mole of an alkyl alcohol having up to three carbon atoms, polymerizing the resulting partial ester with from one to two mole equivalents of vinyl acetate, and mixing the copolymer in finely divided form with a compound of the class consisting of calcium oxide, calcium hydroxide and calcium carbonate.

ROSS M. HEDRICK.
DAVID T. MOWRY.

References Cited in the file of this patent

UNITED STATES PATENTS

| Number | Name | Date |
|---|---|---|
| 2,324,739 | Stoops et al. | July 20, 1943 |
| 2,483,960 | Baer | Oct. 4, 1949 |